(12) United States Patent
Chainani et al.

(10) Patent No.: US 9,372,892 B1
(45) Date of Patent: Jun. 21, 2016

(54) BLOOM FILTER CONSTRUCTION METHOD FOR USE IN A TABLE JOIN OPERATION PORTION OF PROCESSING A QUERY TO A DISTRIBUTED DATABASE

(71) Applicant: International Business Machines Corporation, Armonk, NY (US)

(72) Inventors: Naresh K. Chainani, Portland, OR (US); Kiran K. Chinta, Hillsboro, OR (US); Yuan Su, Unionville (CA); Liping Zhang, Portland, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/981,215

(22) Filed: Dec. 28, 2015

(51) Int. Cl.
*G06F 17/30* (2006.01)
(52) U.S. Cl.
CPC .............. *G06F 17/30498* (2013.01)

(58) Field of Classification Search
CPC ................................. G06F 17/30498
USPC ......... 707/706, 713, 722, 736, 758, 759, 764, 707/781
See application file for complete search history.

(56) References Cited

U.S. PATENT DOCUMENTS

| 8,825,678 B2 | 9/2014 | Potapov et al. |
| 2015/0169655 A1 | 6/2015 | Gupta |

*Primary Examiner* — Syling Yen
(74) *Attorney, Agent, or Firm* — Weitzman Law Offices, LLC

(57) ABSTRACT

A method for use in processing database queries performed on a database, having tables made up of outer table data and corresponding inner table data, distributed among storage associated with multiple nodes of a multi-threaded cluster of computers is described. The method involves constructing a Bloom filter at nodes by merging Bloom filter components on each node using different startingOffset positions for each thread and then, once the Bloom filter is complete at a node and using the complete Bloom filter as a join filter in a table join operation, without regard to Bloom filter construction occurring at others of the multiple nodes.

1 Claim, 4 Drawing Sheets

BLOOM FILTER CONSTRUCTION METHOD FOR USE IN A TABLE JOIN OPERATION PORTION OF PROCESSING A QUERY TO A DISTRIBUTED DATABASE

FIELD OF THE INVENTION

This disclosure relates generally to computer processing and, more particularly, to processing queries to a distributed database.

BACKGROUND

In a distributed database setting, the processing of queries often require distributed "join" operations be performed. It is important that the distributed join operations be performed efficiently because joins are expensive in terms of communication costs. As a result, Bloom filters are used to compress the join-related attributes and thereby reduces the required communication bandwidth. With Bloom filters, instead of sending the actual data, throughout the distributed system, a compressed form of the information, containing just enough information to test set membership, is distributed among the nodes participating in processing a query. Thus, Bloom filters are used in some database join operations to improve performance by obtaining key values from one table and using them to discard unqualified data from other table(s), thereby reducing the data scanned, joined and communicated within the distributed system.

Although use of Bloom filters conceptually improve performance relative to the same processing without use of a Bloom filter, they nevertheless also consume memory and need to be communicated among the nodes in the distributed database system involved in processing a query.

Typically, a Bloom filter is centrally built and then distributed to all of the nodes participating in the processing of a query. However, when a query is processed for a large analytic data set, the size of Bloom filters will also be large. Moreover, if that large analytic data set is part of a large distributed database system, those large Bloom filters will need to be communicated to all of the nodes participating in the processing of the query, which can result in use of significant bandwidth and communication network latency. This is unacceptable for large analytic queries in mission critical systems where performance is critical.

In order to reduce the adverse bandwidth and latency effects caused by sending a centrally built Bloom filter, some approaches have taken to breaking up the Bloom filter into pieces that are later merged at the individual nodes. However, this approach can have problems as well because, at each node, multiple threads participate in the merge of the Bloom filters from each node to create the complete Bloom filter so the nodes must coordinate their sending and receiving of their Bloom filter components with each other, causing performance issues, and, within a node, some form of mutex locking mechanism must be used to prevent the threads of the node from writing to the same part of the Bloom filter at the same time, causing more localized adverse performance issues.

Thus, there is an ongoing technological problem involving transferring and constructing Bloom filters at relevant nodes for use in connection with a database join operation.

SUMMARY

We have developed a technical solution to address the aforementioned problems inherent with constructing a Bloom filter for use in connection with distributed database query processing. Our technical solution improves upon the aforementioned approaches because it eliminates the need for tight coordination among nodes for Bloom filter construction during a query of a distributed database within a multi-threaded cluster of computers. Our solution further improves upon the aforementioned approaches because it significantly reduces the need for a mutex locking mechanism when constructing a Bloom filter from Bloom filter components received from other nodes.

One aspect of this disclosure involves a method for use in processing database queries performed on a database, having tables made up of outer table data and corresponding inner table data, distributed among storage associated with multiple nodes of a multi-threaded cluster of computers each having at least one processor. The method involves, in response to a specific query of the database, sending the specific query to nodes in the multi-threaded cluster of computers that are query processing nodes. Each of the query processing nodes have a NodeID.

For the specific query, the method also involves generating, using at least one thread, a local portion of a Bloom filter bitmap from the specific query based upon inner table data stored in the storage associated with that node, and broadcasting the Bloom filter bitmap containing the portion to others of the query processing nodes as a filter file component of a complete Bloom filter along with a startingOffset position. The broadcasting begins at the startingOffset position and continues until an end of the Bloom filter bitmap containing the portion is reached. Then, the broadcasting continues from a start of the Bloom filter bitmap containing the portion until the startingOffset position is reached. The startingOffset position is determined according to the formula $$startingOffset\ position = \frac{size\ of\ the\ complete\ Bloom\ filter}{number\ of\ query\ processing\ nodes} \times f(NodeID)$$

where f(NodeID) is a function that maps the NodeID to a unique consecutive sequence such that the startingOffset position is within the size of the complete Bloom filter.

The method further involves, constructing a local copy of the complete Bloom filter by combining the local portion with filter file components of the complete Bloom filter received from other query processing nodes involved in processing the specific query. The constructing specifically involves (i) with at least one thread, writing the local portion as a first part of the complete Bloom filter, beginning at a location corresponding to the startingOffset position and continuing until the end of the complete Bloom filter is reached and then continuing from the start of the complete Bloom filter until the startingOffset position is reached, (ii) receiving a second filter file component and corresponding second startingOffset position from a second query processing node involved in processing the specific query and writing, with a second thread, the second filter file component as a second part of the complete Bloom filter, beginning at the second startingOffset position and continuing until the end of the complete Bloom filter is reached and then continuing from the start of the complete Bloom filter until the second startingOffset position is reached, (iii) receiving additional file components and corresponding additional startingOffset positions from additional query processing nodes involved in processing the specific query, until all file components of the complete Bloom filter have been received, and writing the additional filter file component, with additional threads, as additional parts of the complete Bloom filter, beginning at respective corresponding additional startingOffset positions and continuing until the end of the complete Bloom filter is reached and then continuing from the start of the complete Bloom filter until the respective additional startingOffset position is reached.

Once the local copy of the complete Bloom filter has been constructed using the local portion, second filter file component, and additional file components, at any individual node of the query processing nodes, the individual node will use the complete Bloom filter as a join filter for outer table data, stored in the storage associated with the individual node, in a table join operation, without regard to Bloom filter construction occurring at others of the multiple nodes.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

This disclosure describes a technical solution to address problems inherent with constructing a Bloom filter for use in connection with database query processing. Our technical solution eliminates the need for tight coordination among nodes for Bloom filter construction during a query of a distributed database within a multi-threaded cluster of computers. Our solution further improves upon the aforementioned approaches because it significantly reduces the need for a mutex locking mechanism when constructing a Bloom filter from Bloom filter components received from other nodes.

Figure 1:
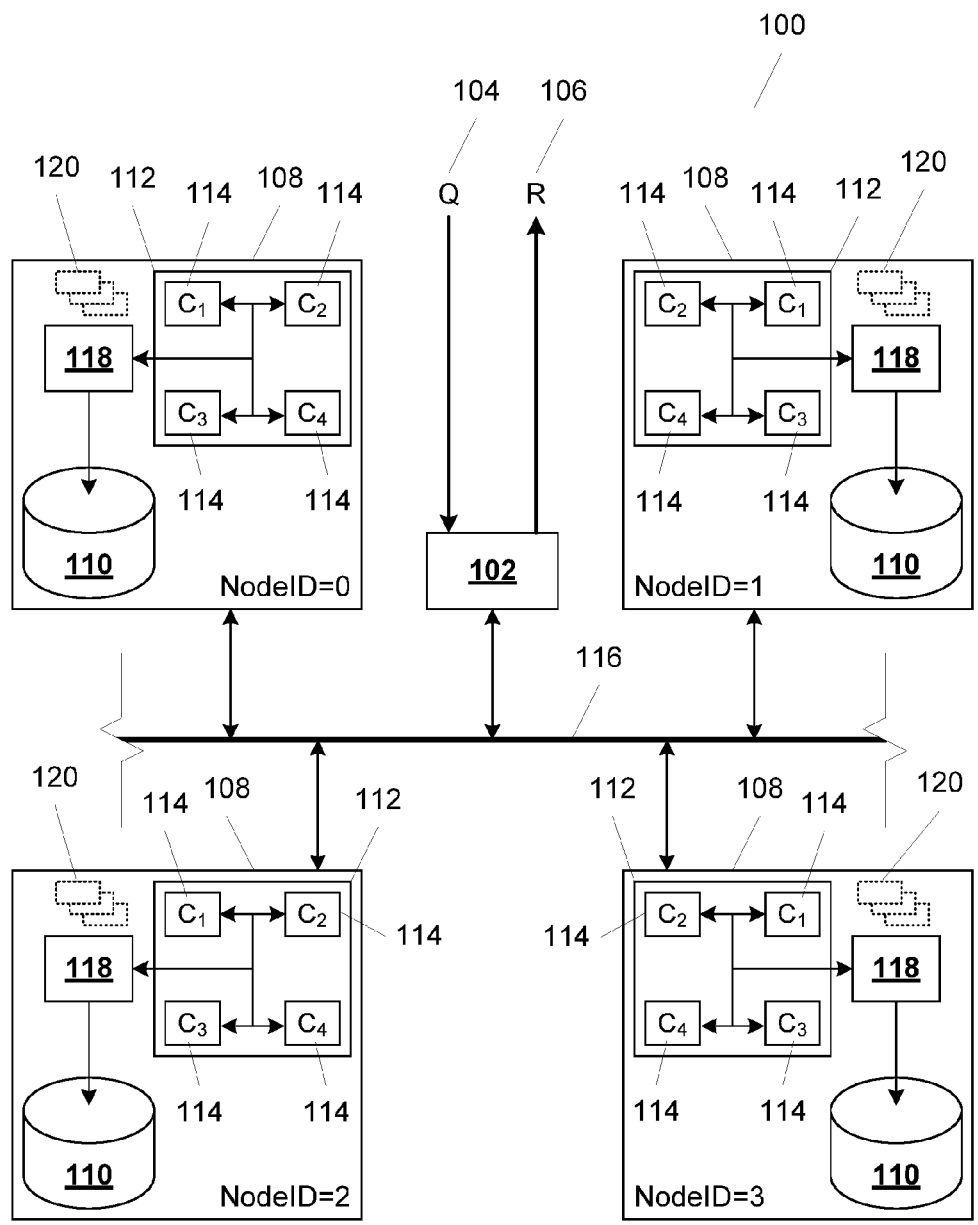
FIG. 1 illustrates, in simplified form, an example representation of the relevant portion of a distributed database system implementing our solution.

FIG. 1 illustrates, in simplified form, an example representation of the relevant portion of a distributed database system 100 implementing our solution. The system 100 is made up of a distributed query processor 102 that receives queries 104 ("Q"), has them processed within the system 100, and returns results 106 ("R"). Specifically, the distributed query processor 102 sends the query "Q" to multiple, typically, geographically remote, nodes 108 for processing. In FIG. 1, the distributed query processor 102 is shown for conceptual purposes as a separate and distinct unit from the nodes 108, however it should be understood that the distributed query processor 102 could itself be part of, for example, one of the other nodes (not shown) of the system 100 or it could be running on a server that does not contain any nodes 108 of the system 100.

The remote nodes 108 generally include at least: storage 110, within which a portion of the distributed database and its data are stored, and at least one processing unit 112 (a CPU or multi-core processor) which can execute multiple processes or threads concurrently. As shown in FIG. 1, for example purposes only, the processing unit 112 for each node 108 is a multi-core processor having four cores 114. The nodes 108 and distributed query processor 102 are all interconnected and communicate via a network 116, only part of which is shown for simplicity.

The storage 110 stores format defining data structures, data-containing structures, and program instructions in a non-transitory manner, for example, such as non-transient solid state memory, a magnetic hard drive, a tape drive, or an analogous or equivalent storage medium type would.

In addition, the nodes 108 use a Bloom filter 118 (also interchangeably sometimes referred to herein as a "Bloom filter bitmap") as part of their processing of a received query, the Bloom filter 118 having been constructed, as described in greater detail below, from local portions 120 of Bloom filters generated locally by each node 108 and distributed to the other nodes via the network 116. Either as part of the configuring of the system 100 or as part of the query processing, each node is assigned a "NodeID" so that it can identify itself to other nodes and the distributed query processor 102. As shown, the Nodes 108 have been assigned NodeIDs of 0, 1, 2 & 3. In general, the NodeIDs will correspond to the node list that is conventionally included in the query plan created by the distributed query processor 102. Alternatively, the NodeID may be entirely unrelated to any other identifier that the node may have, for example, in some implementations, it can be assigned in the node list such that the nodes are sequentially numbered starting with zero. For simplicity of understanding, as shown the nodes 108 have NodeIDs sequentially starting with zero. As will be described in greater detail below, for purposes of our solution, the important aspect for the NodeID is that it can be used to determine a "startingOffset" position for writing the Bloom filter bitmap, not its particular form or format.

With the foregoing in mind, the Bloom filter construction aspect of our solution will now be described. However, since the steps involved in distributed query processing leading up to creation of a Bloom filter are conventional and well know, those steps will either not be described, or will be partially described in a cursory fashion where helpful for understanding our solution.

As noted above, each node 108 has associated storage 110 where a portion of the distributed database is stored. As is known, the database portion that resides in the storage 110 includes multiple tables made up of outer table data and corresponding inner table data.

Each individual node 108, following receipt of a query, will build a local portion 120 of an overall Bloom filter 118 that will ultimately be used as part of a table join operation. Since Bloom filters per se and their subsequent use in database table join operations that are part of distributed database query processing are well known, those details will be omitted herein.

In any event, for completeness, a Bloom filter is a data structure, generated using some form of hash-coding involving one or more table keys and the inner table data, and stored within a bitmap. In this manner, using a Bloom filter, a table join operation can work on a smaller subset of information (in terms of scanning, joining and communication), preserving memory and reducing latency.

Figure 2:
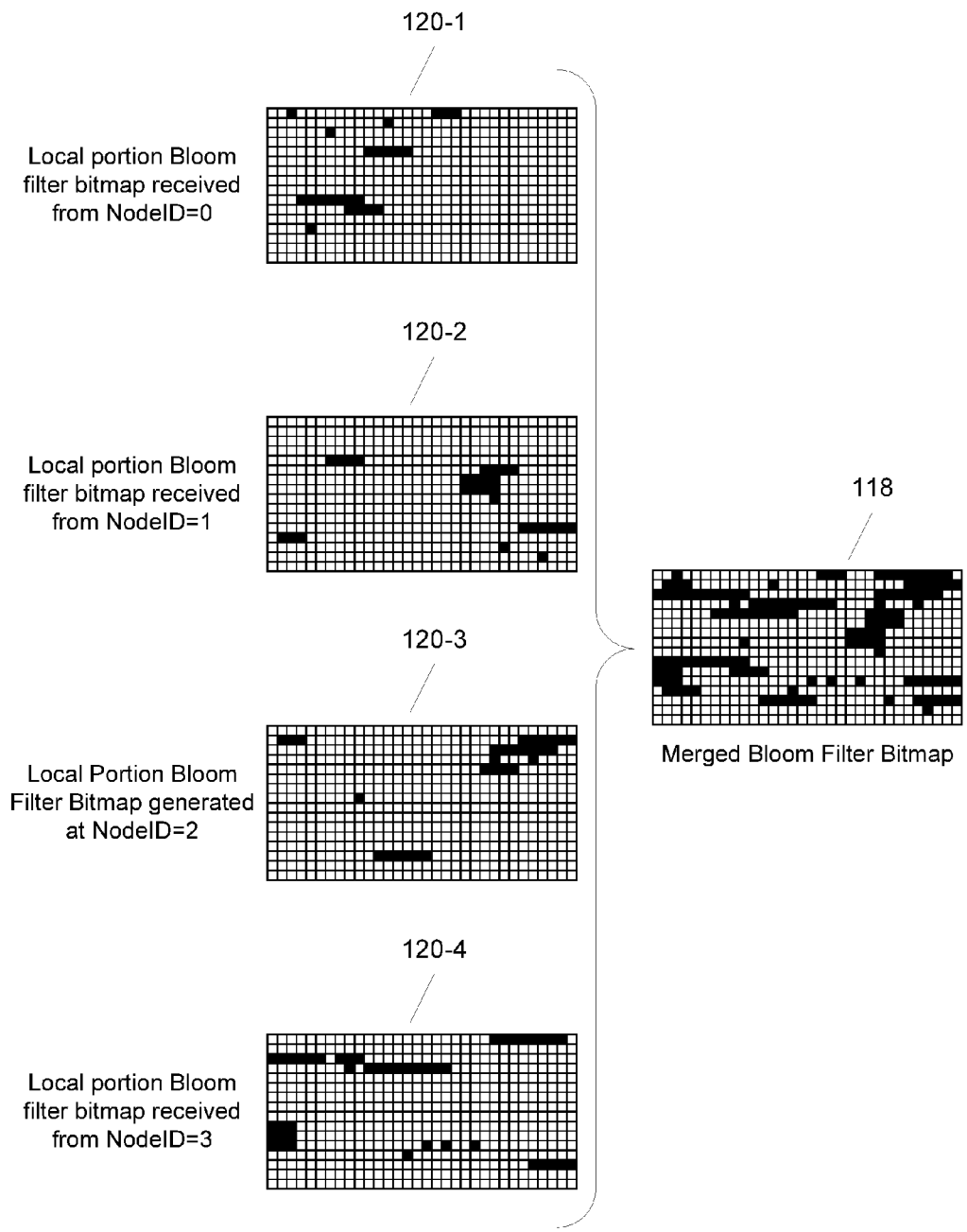
FIG. 2 illustrates, in simplified form, a representative example overview of how a Bloom filter is created, presuming the system of FIG. 1.

FIG. 2 illustrates, in simplified form, a representative example overview of how a Bloom filter as described above is created, presuming the system of FIG. 1 and that only the four nodes 108 shown will take part in the processing of the query.

As noted above, before the query can be processed at each node 108, the local portions of the complete Bloom filter must be distributed to all of the other nodes. In other words, each individual node 108 is a sending node that will broadcast its local portion to the other nodes. Consequently, each individual node 108 is also a receiving node with respect to local portions broadcast by all the other nodes. In other words, each node will be both a sending node and a receiving node with respect to processing of a query. For purposes of simplicity, the description will be from the perspective of the node 108 with the NodeID=2, recognizing that the same process will be performed on each of the nodes.

As shown in FIG. 2, each of the nodes 108: NodeID=0, NodeID=1, NodeID=2, NodeID=3, has respectively created a local portion 120-1, 120-2, 120-3, 120-4 of the Bloom filter bitmap 118 (each also interchangeably referred to as a "Bloom filter file component") that they all will use to process the query on its portion of the database. For purposes of understanding, the local portions 120-1, 120-2, 120-3, 120-4 of the Bloom filter bitmap 118 are literally represented as a graphical bitmap, however, it is to be understood that this is only a representation and it could equally be represented as, for example, a string of "ones" and "zeros" or a hexadecimal value. From the standpoint of the node 108 with the NodeID=2 its locally-generated portion 120-3 will need to be merged with the local portions 120-1, 120-2, 120-4 it received that were broadcast by the other nodes 108 such that the complete Bloom filter reflects the collective content of all the local portions 120-1, 120-2, 120-3, 120-4.

To avoid the problems noted above, in conjunction with broadcasting their local Bloom filter portions, each node 108 will not broadcast its local portion 120-1, 120-2, 120-4 starting at the beginning of the Bloom filter. Rather, each node 108 will start broadcasting sequential data making up its local portion starting from a different point in their local portion 120-1, 120-2, 120-4 along with "startingOffset" position identifying where in the Bloom filter each respective node's broadcast data starts from.

The "startingOffset" position is a calculated position that, for purposes of constructing the final Bloom filter breaks up the Bloom filter into partitions, so that the threads involved in writing the received local portions in the receiving node 108 will begin their writing at the startingOffset positions, thereby reducing the likelihood of a collision and minimizing the need for mutex locking among the threads. The calculation of the "startingOffset" position is a function of the size of the complete Bloom filter, the number of query processing nodes and the nodeID.

Specifically, the startingOffset position is calculated according to the formula:

$$startingOffset\ position = \frac{size\ of\ the\ complete\ Bloom\ filter}{number\ of\ query\ processing\ nodes} \times f(NodeID)$$

where the numerator and denominator effectively divide the Bloom filter into equal sized partitions and f(NodeID) is a function of the NodeID that maps the value of f(NodeID) to being within the Bloom filter size range. Ideally, f(NodeID) should result in some form of sequential numbering across the nodes involved in that query processing.

For example, if the node list was [0, 1, 2, 3, 4] (i.e., [NodeID=0, NodeID=1, NodeID=2, NodeID=3, NodeID=4]), then f(NodeID) for each node could merely be equal to the NodeID itself, whereas if the node list was [1, 2, 3, 4], then f(NodeID) might be NodeID−1 to yield an f(NodeID) for each respective node in the list of 0, 1, 2, 3.

Likewise, if the node list was [15, 25, 35, 45], then for node 15, which is the first node in the list, f(NodeID)=f(15) should return 0, for node 20, f(NodeID=25) should return 1, f(NodeID=35) should return 2 and f(NodeID=45) should return 3.

In its simplest form f(NodeID) can be assigned as an index to that node in the node list (i.e., the first node 108 in the list gets a NodeID of zero, the second node in the list gets a NodeID of one, and so on). Advantageously, using the index of the node list as f(NodeID), a node list of [10, 13, 27, 54] would still yield an f(NodeID) of, respectively, 0, 1, 2, 3.

With another example, presuming the "size of the complete Bloom filter" is "1000 bytes" and the "number of query processing nodes" is "4"

Then the startingOffset position=1000/4×f(NodeID)= 250×f(NodeID).

Thus, ideally, one would want the startingOffset positions to be at byte 0, byte 250, byte 500, and byte 750, which are all within the range of the complete Bloom filter.

However, if the NodeID values are 10, 11, 12, 13, the startingOffset positions would be byte 2500, byte 2750, byte 3000, and byte 3250 which are all beyond the 1000 byte size of the Bloom filter. Thus, f(NodeID) is not an index, then it would have to be a mod function that brings the product into the range of 0 to 1000.

In addition, while it is preferable for the lowest startingOffset position to be "0" it is not required that be the case, although it creates a more complex scenario to implement. For example, if the "size of the complete Bloom filter" is, for example, "1000 bytes" and the "number of query processing nodes" is, for example, "4", there is no reason why the first startingOffset position could not be "10", in which case the second would then be "260", the third would then be "510", and the fourth would then be "760". Thus, it should be clear that the important aspect is the spacing between the startingOffset positions, not the particular startingOffset positions themselves.

As a further note, in some implementations, the local portion 120 may be written before any of the received portions begin being written. In such cases, the denominator of the formula (i.e., "number of query processing nodes") could exclude the local node in the count. Advantageously, in those implementations, the spacing between the startingOffset positions would be larger, further minimizing the possibility of a collision between writing threads.

Thus, the threads involved in concurrently merging the received portions to create the complete Bloom filter would start out with relatively equal (due to rounding) start position spacing from each other.

Figure 3:
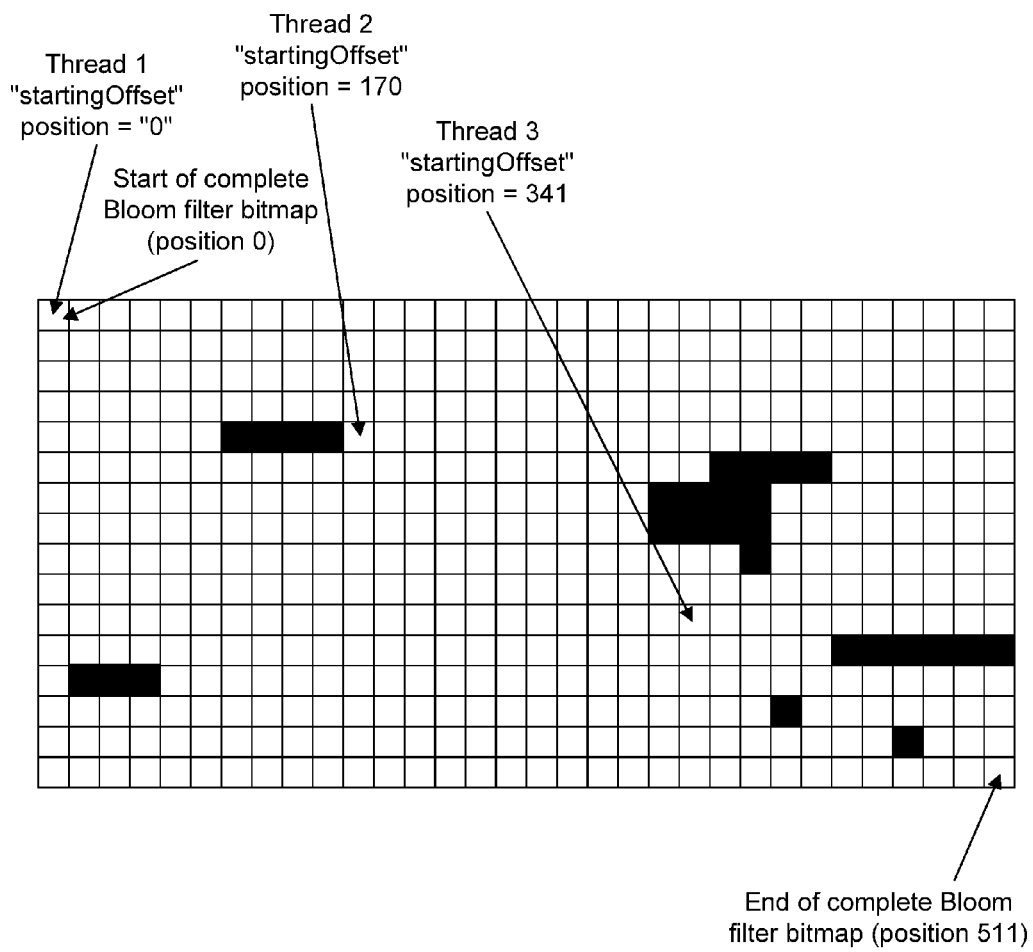
FIG. 3 illustrates, in simplified form, the use of different startingOffset positions by different threads of the receiving node of FIG. 2.

FIG. 3 illustrates, in simplified form, the use of different startingOffset positions by different threads of the receiving node 108 of FIG. 2, in a case where the Bloom filter bitmap is 512 bytes and either the local portion 120-3 Bloom filter bitmap generated at that node 108 has already been written into what will ultimately become the complete Bloom filter bitmap 118 or the post-generation local portion 120-3 Bloom filter bitmap will become the complete Bloom filter bitmap 118.

As shown, three threads will be involved in merging the respective portions 120-1, 120-2, 120-4 received form the other nodes. The first thread will begin its writing of portion 120-1 received from the node with NodeID=0 at the start of the Bloom filter bitmap (position "0") and sequentially continue its writing until it reaches the end of the Bloom filter (position "511"). The second thread will begin its writing of portion 120-2 received from the node with NodeID=1 at position "170" of the Bloom filter bitmap and will write until it reaches the end of the Bloom filter (position "511"), at which point it will then begin writing from the start of the Bloom filter bitmap (position "0") and sequentially continue until it has written position "169" of the Bloom filter bitmap, thereby having written the entire span of the Bloom filter bitmap. The third thread will begin its writing of portion 120-4 received from the node with NodeID=3 at position "341" of the Bloom filter bitmap and will write until it reaches the end of the Bloom filter (position "511"), at which point it will then begin writing from the start of the Bloom filter bitmap (position "0") and sequentially continue until it has written position "340" of the Bloom filter bitmap, thereby having also written the entire span of the Bloom filter bitmap.

Once the complete Bloom filter bitmap 118 has been constructed by merger of all the local portions 120, the complete Bloom filter bitmap 118 can be used in a table join operation.

Moreover, since all nodes 108 may not complete at the exact same time, once the complete Bloom filter bitmap 118 has been constructed, the complete Bloom filter bitmap 118 can be used as a join filter for the outer table data, corresponding to the inner table data used to create the Bloom filter bitmap, in a table join operation without regard to whether Bloom filter construction at any other node 108 is complete or that node is still broadcasting its local portion.

In addition, on each receiving node, since with our solution the writing by the threads should be contention free, only a partition-level latch needs to be implemented to coordinate threads in the, generally rare, event they do need to write to the same partition at the same time.

Figure 4:
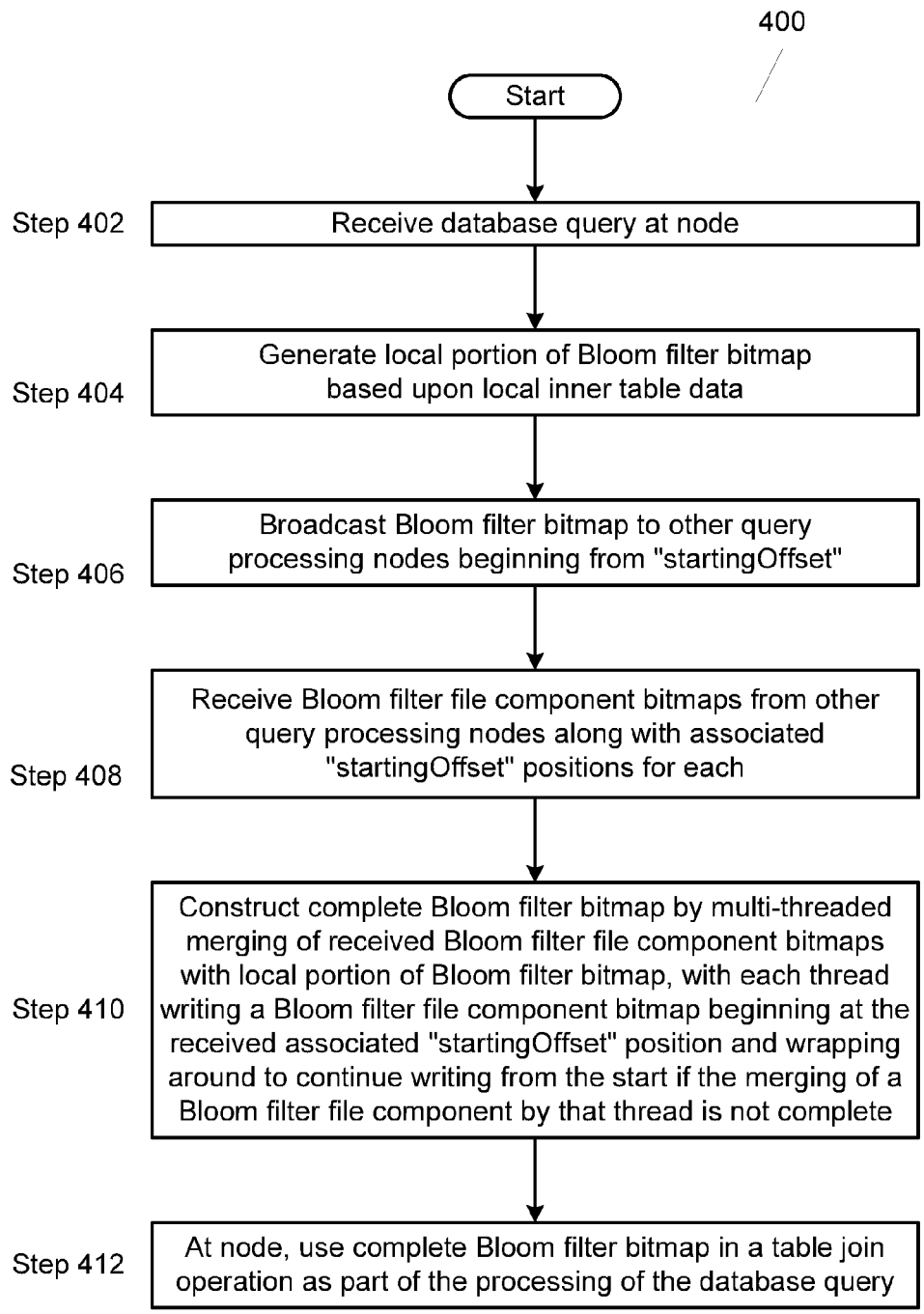
FIG. 4 is a summary flowchart providing a simplified overview process corresponding the operation of an individual node according to our solution.

FIG. 4 is a summary flowchart 400 providing a simplified overview process corresponding the operation of an individual node according to our solution.

The process begins with the receipt of a database query at a node (Step 402). That node generates a local portion of a Bloom filter bitmap, based upon local inner table data at that node (Step 404). The node will then broadcast its local Bloom filter bitmap (including its NodeID and/or its "startingOffset" position) to the other query processing nodes beginning from the "startingOffset" position (Step 406). That node will also receive Bloom filter file component bitmaps broadcast by other query processing nodes along with their respective "startingOffset" positions (Step 408). Note here that, depending upon the particular circumstance, Step 406 and Step 408 could proceed sequentially as shown, or Step 408 could begin before Step 406 is compete (i.e., Step 408 could overlap, in whole or part, with Step 406).

In any case, the process continues with the construction of a complete Bloom filter bitmap through a multi-threaded merging of the received Bloom filter file component bitmaps with the local Bloom filter bitmap such that each thread begins at the received associated respective "startingOffset" position and, if it has not completed its writing when it gets to the end of the Bloom filter bitmap, it will continue writing starting at the beginning of the Bloom filter bitmap until it has returned to its respective "startingOffset" position (Step 410).

Finally, once the complete Bloom filter bitmap has been constructed, it is used as part of the database query processing in a table join operation.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A method for use in processing database queries performed on a database, having tables made up of outer table data and corresponding inner table data, distributed among storage associated with multiple nodes of a multi-threaded cluster of computers each having at least one processor, the method comprising:

in response to a specific query of the database, sending the specific query to nodes in the multi-threaded cluster of computers that are query processing nodes, each of the query processing nodes having a NodeID;

for the specific query, using the at least one processor at each query processing node, generating, using at least one thread, a local portion of a Bloom filter bitmap from the specific query based upon inner table data stored in the storage associated with that node, and broadcasting the Bloom filter bitmap containing the portion to others of the query processing nodes as a filter file component of a complete Bloom filter along with a startingOffset position, the broadcasting beginning at the startingOffset position and continuing until an end of the Bloom filter bitmap containing the portion is reached and then continuing from a start of the Bloom filter bitmap containing the portion until the startingOffset position is reached, the startingOffset position being determined according to the formula $$startingOffset\ position = \frac{\text{size of the complete Bloom filter}}{\text{number of query processing nodes}} \times f(NodeID)$$

where f(NodeID) is a function that maps the NodeID to a unique consecutive sequence such that the startingOffset position is within the size of the complete Bloom filter;

constructing a local copy of the complete Bloom filter by combining the local portion with filter file components of the complete Bloom filter received from other query processing nodes involved in processing the specific query, the constructing involving (i) with at least one thread, writing the local portion as a first part of the complete Bloom filter, beginning at a location corresponding to the startingOffset position and continuing until the end of the complete Bloom filter is reached and then continuing from the start of the complete Bloom filter until the startingOffset position is reached, (ii) receiving a second filter file component and corresponding second startingOffset position from a second query processing node involved in processing the specific query and writing, with a second thread, the second filter file component as a second part of the complete Bloom filter, beginning at the second startingOffset position and continuing until the end of the complete Bloom filter is reached and then continuing from the start of the complete Bloom filter until the second startingOffset position is reached, (iii) receiving additional file components and corresponding additional startingOffset positions from additional query processing nodes involved in processing the specific query, until all file components of the complete Bloom filter have been received, and writing the additional filter file component, with additional threads, as additional parts of the complete Bloom filter, beginning at respective corresponding additional startingOffset positions and continuing until the end of the complete Bloom filter is reached and then continuing from the start of the complete Bloom filter until the respective additional startingOffset position is reached, and once the local copy of the complete Bloom filter has been constructed using the local portion, second filter file component, and additional file components, at any individual node of the query processing nodes, the individual node will use the complete Bloom filter as a join filter for outer table data, stored in the storage associated with the individual node, in a table join operation, without regard to Bloom filter construction occurring at others of the multiple nodes.

* * * * *